(12) United States Patent
Zhang

(10) Patent No.: US 7,483,404 B2
(45) Date of Patent: Jan. 27, 2009

(54) POWER CONTROL FOR MOBILE STATION IN A CDMA-TDD SYSTEM

(75) Inventor: Shu Zhang, Shanghai (CN)

(73) Assignee: ST Wireless SA, Geneva (CH)

( * ) Notice: Subject to any disclaimer, the term of this patent is extended or adjusted under 35 U.S.C. 154(b) by 306 days.

(21) Appl. No.: 10/540,689

(22) PCT Filed: Dec. 23, 2003

(86) PCT No.: PCT/IB03/06175

§ 371 (c)(1),
(2), (4) Date: Apr. 17, 2006

(87) PCT Pub. No.: WO2004/059874

PCT Pub. Date: Jul. 15, 2004

(65) Prior Publication Data

US 2006/0245397 A1    Nov. 2, 2006

(30) Foreign Application Priority Data

Dec. 27, 2002 (CN) .............................. 02 1 58994

(51) Int. Cl.
*H04B 7/185* (2006.01)

(52) U.S. Cl. .................. 370/318; 370/317; 370/320; 455/522; 455/63.1; 455/63.2; 455/67.13; 455/68; 455/69; 455/70

(58) Field of Classification Search ................. 455/522, 455/63.1, 63.2, 67.13, 68, 69, 70; 370/317, 370/318
See application file for complete search history.

(56) References Cited

U.S. PATENT DOCUMENTS

| 6,334,047 | B1 * | 12/2001 | Andersson et al. ............. 455/69 |
| 7,058,400 | B2 * | 6/2006 | Brooks ....................... 455/424 |
| 2002/0094834 | A1 * | 7/2002 | Baker et al. .................. 455/522 |
| 2003/0060224 | A1 * | 3/2003 | Nelson et al. ................ 455/522 |
| 2003/0134655 | A1 * | 7/2003 | Chen et al. ................... 455/522 |

* cited by examiner

*Primary Examiner*—Lester Kincaid
*Assistant Examiner*—Mehmood B Khan

(57) ABSTRACT

A mobile terminal in CDMA-TDD system and a method thereof, wherein the terminal comprises a receiving means, receiving and processing wireless signals from a downlink; a transmitting means, transmitting wireless signals via a uplink; and a transmit power control means, receiving a power control message transmitted via the downlink, after acquiring a channel gain value between said mobile terminal and a base-station, calculating a value of the transmit power of said mobile terminal according to said power control message, said channel gain value and a set processing gain value, and adjusting the transmit power of said mobile terminal according to said value of the transmit power, wherein said adjusting the transmit power of said mobile terminal is synchronized with those of other terminals assigned within a same time slot.

16 Claims, 3 Drawing Sheets

POWER CONTROL FOR MOBILE STATION IN A CDMA-TDD SYSTEM

FIELD OF THE INVENTION

The present invention relates to a power control method for mobile terminal; more particularly, relates to a power control method for mobile terminal based on CDMA-TDD mode system.

BACKGROUND OF THE INVENTION

With the growing maturity of mobile telecommunication technologies, demands of mobile subscribers increase rapidly for services such as Internet, multimedia application, file transfer and etc, one of whose notable features lies in different requirements for the uplink capacity and the downlink capacity. Thereafter, telecommunication system needs to be able to allocate different capacities for the uplink and the downlink, according to different requirements of services.

CDMA-TDD technology can nicely meet the requirements of these services, because the utilization of the TDD frequency bands between its uplink and downlink is not fixed, but can be adjusted according to the requirements of services. Therefore, CDMA-TDD technology finds its niche in the mobile telecommunication field where CDMA-FDD technology dominates. For instance, it's covered in the 3$^{rd}$ generation UTRA (UTRA: UMTS Terrestrial Radio Access) standard.

In CDMA-TDD technology, all subscribers send messages concurrently using the same band, which is likely to cause mutual interference. Therefore, multiple access interference arises as its major capacity bottleneck, and thus the key issue to increase system capacity is to reduce multiple access interference.

Researches and practices indicate that power control, especially uplink power control, can effectively remove the near-far effect and reduce various interferences, and thus enlarge system capacity and provide better QoS. Two kinds of existing power control, open-loop power control and closed-loop power control, are both widely employed in our daily life. However, undeniably their working principles both have disadvantages, which should be overcome to boost the system performance.

Now, we will take the uplink power control of UTRA TDD as an example, to demonstrate the principles and flaws of existing open-loop power control and closed-loop power control mechanisms.

FIG. 1 illustrates a simplified CDMA system, which consists of n transmitters 1, n channels 3 and a receiver 2. As shown in FIG. 1, the receiver 2 can receive signals from different transmitters 1, but only one signal is useful while others will be deemed as interference.

In open-loop power control mechanism, the output power of a mobile terminal is based on the path loss of the downlink PCCPCH (Primary Common Control Physical Channel), the target Signal-to-Interference Ratio (SIR) provided by the outer loop and the interference signal level in every time slot of the telecommunication network. The following formula is to calculate the uplink transmit power (please refer to 3GPP TS25.331: RRC Protocol Specification):

$$P_{UE} = \alpha L_{PCCPCH} + (1-\alpha)L_0 + I_{BTS} + SIR_{target} + C \quad (1)$$

Where, $P_{UE}$ is the transmit power level of the mobile terminal in dBm;

$L_{PCCPCH}$ is the measured path loss in dB on PCCPCH;

$L_0$ is the long term average of $L_{PCCPCH}$ in dB;

$I_{BTS}$ is the interference signal power level at the base station in dBm, which is broadcast on BCCH (Broadcast Control Channel) or individually signaled to each mobile terminal.

$\alpha$ is a weighting parameter, which represents the quality of the path loss measurements. $\alpha$ may be a function of the time delay between the uplink time slot and the latest downlink PCCPCH time slot.

$SIR_{target}$ is target SIR provided by the outer loop, which is individually signaled by the base station to every mobile terminal.

C is a constant value to be set by a higher layer.

The above describes the basic principle of open-loop power control, while closed-loop power control is based on SIR and TPC (transmit power control) processing procedure (please refer to 3GPP TS 25.224: Physical layer procedures (TDD)). The base station will first estimate the Signal-to-Interference Ratio ($SIR_{est}$) of the uplink channel, and then generate TPC command and transmit the command to the corresponding mobile terminal according to the following rule: if $SIR_{est} > SIR_{target}$, then the TPC command to transmit is 'down'; if $SIR_{est} < SIR_{target}$, then the TPC command to transmit is 'up'. $SIR_{target}$ is the target SIR, to be set by a higher-level outer loop.

After the TPC command is sent to the mobile terminal, the processing procedure needs to make relevant decisions according to the TPC bits. When the TPC bits are regarded as 'down', the transmit power of the mobile terminal will be decreased by one power control step; when the TPC bits are regarded as 'up', the transmit power of the mobile terminal will be increased by one power control step.

For example, the coordinate operation of open-loop power control and closed-loop power control can be an uplink signal transmission on DTCH (Dedicated Traffic Channel). The initial uplink transmit power of DTCH can be determined by open-loop power control. After the initial phase, closed-loop power control starts to take effects to control the transmit power, along with the open-loop power control.

However, current uplink open-loop power control and closed-loop power control both have their disadvantages. The interference signal level used in current uplink power control algorithms is based on previous status information of the communication link, and the base station's periodical adjustment to the transmit power of each mobile terminal is done independently. So, power adjustment of every mobile terminal can affect SIR of others, causing constant variances of the interference signal level. This is especially true at the beginning of a call and after each handover. Therefore, power control of mobile terminal is very slow for convergence speed, which degrades the system performance.

SUMMARY OF THE INVENTION

It is, therefore, an object of the invention to provide a power control method for mobile terminal based on CDMA-TDD mode system. In this method, every mobile terminal allocated in the same time slot, can adjust synchronously its transmit power to the corresponding value at the time of transmitting. Thus the convergence speed of power control adjustment is accelerated and the system performance is improved.

To achieve the object above, a method for controlling a mobile terminal's transmit power in CDMA-TDD mode system, according to the invention, comprising the following steps:

Receiving a power control message from a base station transmitted via a downlink;

Acquiring the channel gain value between said mobile terminal and said base station according to information transmitted via the downlink;

Calculating a value of the transmit power of said mobile terminal, according to said power control message, said channel gain value and a set processing gain value; and Adjusting the transmit power of said mobile terminal according to said value of the transmit power, wherein said adjusting the transmit power of said mobile terminal is synchronized with those of other mobile terminals assigned within the same time slot.

To fulfill the object above, a device for controlling a mobile terminal's transmit power in CDMA-TDD mode system, according to the invention, comprising:

A receiving module, for receiving a power control message from a base station transmitted via a downlink;

A channel gain calculating module, for acquiring the channel gain value between said mobile terminal and said base station according to information transmitted via the downlink; and A transmit power calculating and setting module, for calculating a value of the transmit power of said mobile terminal according to said received power control message, said channel gain value and a set processing gain value, and adjusting the transmit power of said mobile terminal according to said value of the calculated transmit power, wherein said adjusting the transmit power of said mobile terminal is synchronized with those of other mobile terminals assigned within the same time slot.

To realize the object above, a mobile terminal in CDMA-TDD mode system, according to the invention, comprising:

A receiving means, for receiving and processing wireless signals from a downlink;

A transmitting means, for transmitting wireless signals via an uplink; and

A transmit power control means, for receiving a power control message transmitted via the downlink, after acquiring the channel gain value between said mobile terminal and a base station, calculating a value of the transmit power of said mobile terminal according to said power control message, said channel gain value and a set processing gain value, and adjusting the transmit power of said mobile terminal according to said transmit power value, wherein said adjusting transmit power of said mobile terminal is synchronized with those of other mobile terminals assigned within the same time slot.

To achieve the object above, a method for power control in a base station, according to the invention, comprising the following steps:

Transmitting a power control message via a downlink;

Transmitting information via the downlink, wherein said information is related to a transmit power used when the base station transmits signals; and Simultaneously Receiving power information transmitted by each mobile terminal assigned in the same time slot.

BRIEF DESCRIPTION OF THE DRAWINGS

Further description of the invention will be given below, in conjunction with the accompanying drawings, in which.

DETAILED DESCRIPTION OF THE INVENTION

A detailed description of the invention will be presented as follows, in conjunction with the accompanying drawings and specific embodiments.

The power control method according to the invention is based on SIR balancing (please refer to Performance evaluation of power control algorithms in cellular UTRA systems Forkel, by P. Seidenberg, R. Pabst, G. Heidelberger RWTH Aachen, Germany). SIR balancing is a kind of SIR-based algorithm, And SIR-based power control can gain good system performance, such as nice QoS and huge subscriber capacity, and is easy to be implemented.

Figure 1:
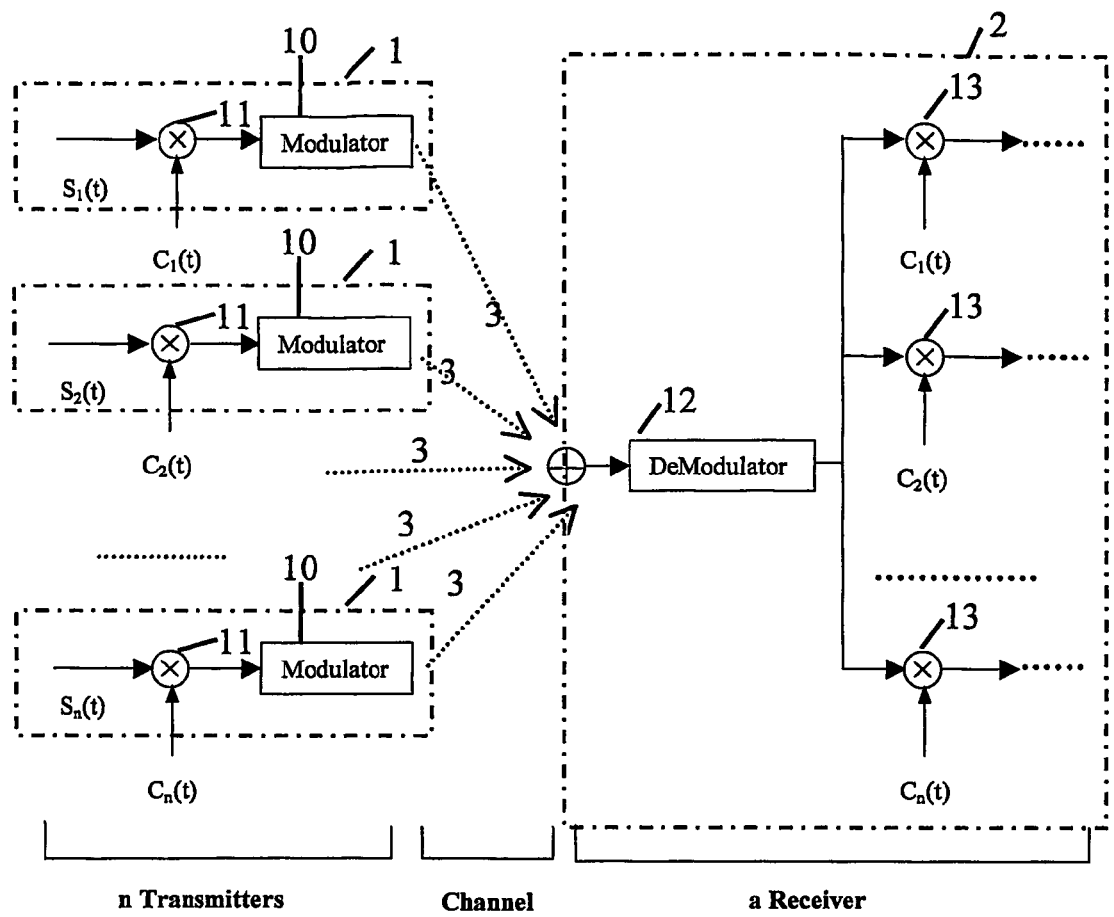
FIG. 1 is the block diagram of a simplified CDMA system.
Figure 2:
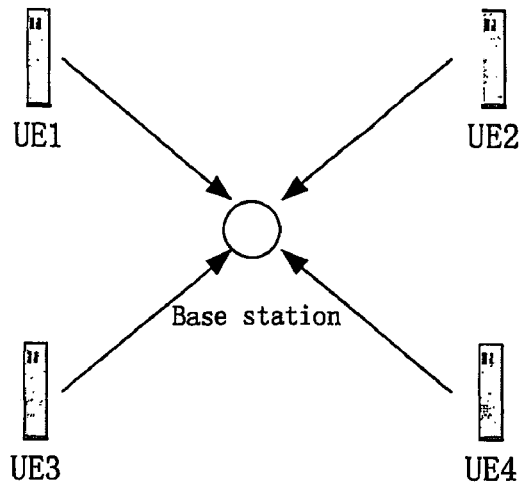
FIG. 2 provides a simplified system with 4 communication links.

A cell will be taken as an example to describe the power control method in CDMA-TDD mode system. As shown in FIG. 2, the cell consists of a base station B, mobile terminal UE-1, UE-2, UE-3, UE-4, and four communication links between the mobile terminals and the base station. For the communication links in FIG. 2, it's assumed that they are assigned in the same time slot and use different spread-spectrum codes.

The SIR balancing algorithm is based on the condition that all mobile terminals have their own target SIR to be set by a higher-layer outer loop. The SIR balancing algorithm can be written as:

$$\begin{cases} \dfrac{G \cdot p_1 r_1}{p_2 r_2 + p_3 r_3 + p_4 r_4 + I_{inter} + N_{bk}} = SIR_{target1} \\ \dfrac{G \cdot p_2 r_2}{p_1 r_1 + p_3 r_3 + p_4 r_4 + I_{inter} + N_{bk}} = SIR_{target2} \\ \dfrac{G \cdot p_3 r_3}{p_1 r_1 + p_2 r_2 + p_4 r_4 + I_{inter} + N_{bk}} = SIR_{target3} \\ \dfrac{G \cdot p_4 r_4}{p_1 r_1 + p_2 r_2 + p_3 r_3 + I_{inter} + N_{bk}} = SIR_{target4} \end{cases} \quad (2)$$

Where,

G is the processing gain value;

$p_i$ is the transmit power of mobile terminal UE-i;

$r_i$ is the channel gain value, which equals to the ratio of the signal power of mobile terminal UE-i received at the base station B to the transmit power of mobile terminal UE-i.

$I_{inte}$ is the inter-cell interference power level at base station B in dBm, which is broadcast on BCCH, or individually signaled to each mobile terminal.

$N_{bk}$ is the background noise.

$SIR_{targeti}$ is the value of target SIR of mobile terminal UE-i, which is set by a higher-layer out loop.

It's assumed there are n mobile terminals defined as UE-1, UE-2, ... and Ue-n in the cell. The SIR balancing algorithm can be written as:

$$\begin{cases} \dfrac{G \cdot p_i r_i}{\sum\limits_{\substack{j=1 \\ j \neq i}}^{n} p_j r_j + I_{inter} + N_{bk}} = SIR_{target\,i} \quad 1 < i \leq n \end{cases} \quad (3)$$

By transforming equation (3), equation (4) can be yielded as:

$$p_i = \frac{SIR_{target\ i} \cdot (I_{inter} + N_{bk})}{r_i \cdot (G + SIR_{target\ i}) \cdot \left(1 - \sum_{i=1}^{n} \frac{SIR_{target\ i}}{G + SIR_{target\ i}}\right)} \quad (4)$$

If all mobile terminals have the same target SIR, i.e. $SIR_{target1}\ SIR_{target2} = \ldots = SIR_{targetn}$, $p_i$ can be written as:

$$p_i = \frac{I_{inter} + N_{bk}}{r_i \cdot \left(\frac{G}{SIR_{target}} - (n-1)\right)} \quad (5)$$

In equation (4) and (5), $SIR_{targeti}$ is the value of target SIR of mobile terminal UE-i, which can be adjusted by a higher-layer outer loop according to the quality of the communication channel. For example, $SIR_{targeti}$ may be adjusted according to BER (Bit Error Rate). If the BER is high, $SIR_{targeti}$ will be increased, while $SIR_{targeti}$ will be decreased if the BER is low. This shows that the value of target SIR of each mobile terminal is generally different.

$r_i$ is the channel gain value, which equals to the ratio of the signal power of mobile terminal UE-i received at base station B to the transmit power of mobile terminal UE-i. In TDD mode, the channel gain value of the uplink is the same as that of the downlink, thus the mobile terminal can obtain $r_i$ by the following equation, according to power levels of transmitted and received PCCPCH signal:

$$r_i = \frac{P_{RXi}}{P_{TX}} \quad (6)$$

Where, $P_{TX}$ is the value of power level of transmitted PCCPCH signal, which is broadcast over the BCCH.

$P_{Rxi}$ is the value of power level of received PCCPCH signal, which is received and measured by mobile terminal UE-i.

Figure 3:
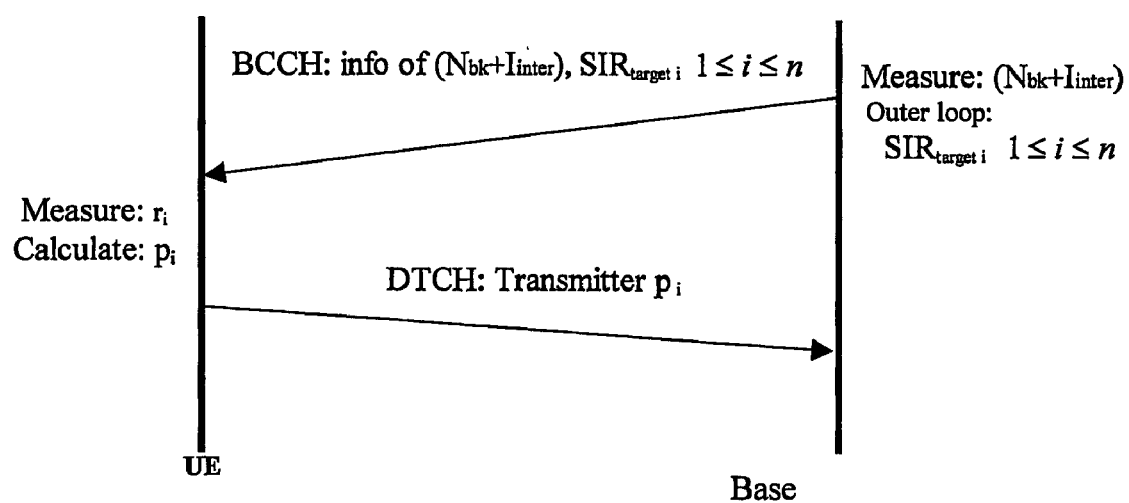
FIG. 3 illustrates the power control message transfer protocol.

FIG. 3 depicts a power control message transfer protocol based on the power control method suggested in the invention. As shown in FIG. 3, the base station B sends power control message to all mobile terminals on BCCH(This can also be done on other common control channels, but BCCH is taken as an example here). The message includes background noise and inter-cell interference ($I_{inter}+N_{bk}$) and $SIR_{targeti}$ ($1 \leq i \leq n$) of every mobile terminal. The base station B should send power control message only when ($I_{inter}+N_{bk}$) or $SIR_{targeti}$ ($1 \leq i \leq n$) has changed, and the power control message should only contain items of ($I_{inter}+N_{bk}$) and $SIR_{targeti}$ ($1 \leq i \leq n$) which have changed. Those items, which have not changed, thus not be broadcast on BCCH, will still be used when calculating the new power value. So the load of the power control message is low.

Figure 4:
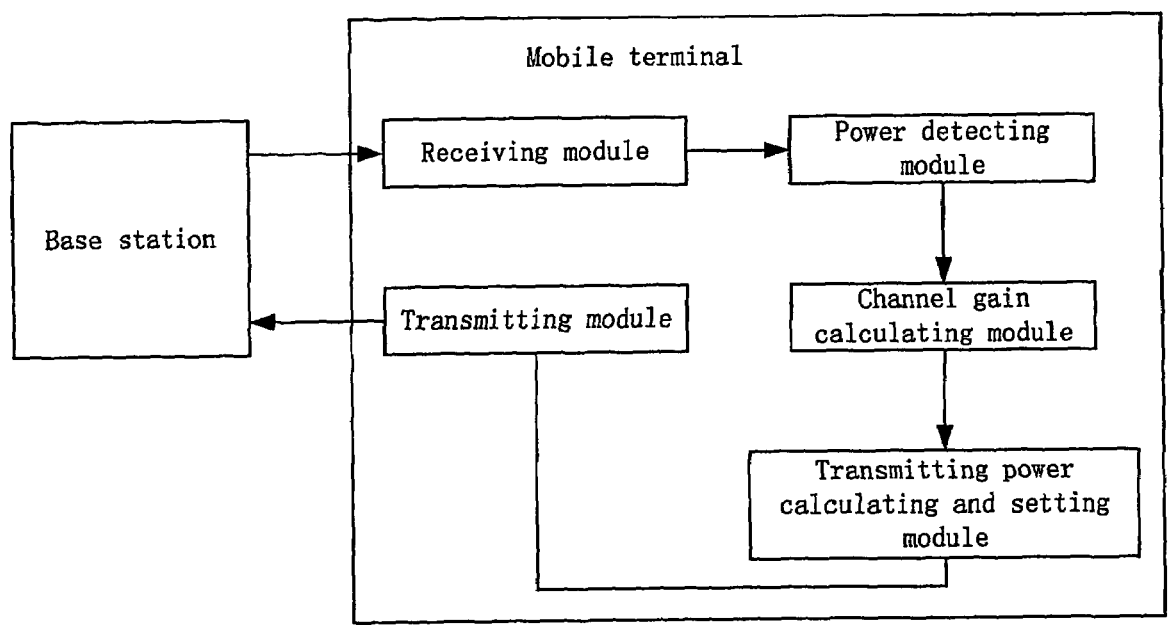
FIG. 4 is the block diagram of the power control module in a mobile terminal.

FIG. 4 shows the power control module in a mobile terminal, which consists of a base station and one of the mobile terminals assigned in the same time slot.

As show in FIG. 4, the mobile terminal is composed of a receiving module, a power detecting module, a channel gain calculating module, a transmit power calculating and setting module and a transmitting module. Wherein:

First, the base station 100 transmits a power control message over BCCH, which at least contains items of $I_{inter}+N_{bk}$ and $SIR_{targeti}$ ($1 \leq i \leq n$) which have changed.

Secondly, the receiving module 200 of the mobile terminal receives the power control message from the base station transmitted over BCCH.

Thirdly, the power detecting module 300 of the mobile terminal detects power level $P_{Rxi}$ of signal input received by the mobile terminal over the physical channel PCCPCH, and acquires the power level $P_{TX}$ of the signal input which the base station transmits over said physical channel.

Fourthly, the channel gain calculating module 500 of the mobile terminal calculates the channel gain value $r_i$ between the mobile terminal and the base station, according to the detected power level $P_{Rxi}$ of signal input from the physical channel PCCPCH and the power level $P_{TX}$ of the signal input to be transmitted over the physical channel PCCPCH.

Fifthly, the transmit power calculating and setting module 600 of the mobile terminal calculates transmit power $P_i$ of the mobile terminal by equation (4), according to the received power control message, the calculated channel gain value $r_i$ and the processing gain value G, and adjusts the transmit power of the mobile terminal to the calculated transmit power $P_i$.

Sixthly, the transmitting module 400 of the mobile terminal transmits signals with the calculated transmit power $P_i$ by the transmit power calculating and setting module.

Adjusting the transmit power of every mobile terminal allocated in the same time slot is synchronized, so the base station can receive simultaneously signals transmitted by the mobile terminals with the adjusted transmit power.

Summarily, transmit power $P_i$ of mobile terminal UE-i can be calculated by equation (4). Because equation (4) is derived from equation (3) and $SIR_{targeti}$ in equation (3) is calculated according to the adjusted transmit power with which all mobile terminals allocated in the same time slot will transmit signals next time. That is to say, the adjusted transmit power of every of all the mobile terminals, is calculated based on shared communication resources. Thus, according to power control method proposed by the invention, the adjusted transmit power can be calculated simultaneously, and all the mobile terminals in the same time slot can simultaneously adjust their transmit power in the transmitting phase, which can effectively eliminate the shortcomings brought by current control algorithms that adjust the transmit power of mobile terminals individually by previous link status information, and rapidly accelerate the convergence speed of power adjustment and boost the system performance.

As shown in FIG. 3, the base station B sends power control message only when the background noise and the inter-cell interference have changed, or the target SIR of each mobile terminal has changed, and power control message only include items of the background noise, the interference between cells and the target SIR of each mobile terminal which have changed. Those items that have not changed and thus haven't transmitted over BCCH should continue to be used when calculating the new transmit power. This indicates the power control message load is low for the system.

While the invention has been shown and described with respect to the preferred embodiment, it will be understood by those skilled in the art that the uplink power control method and the power control message transfer protocol provided in this invention can be applied in any CDMA-TDD mode system.

It will also be understood by those skilled in the art that various modifications can be made to the uplink power control method and the power control message transfer protocol released in this invention, without departing from the fundamentals of the contents of the invention. Therefore, the scope of the invention to be protected needs to be determined by what is claimed.

What is claimed is:

1. A method for controlling a mobile terminal's transmit power in CDMA-TDD system, comprising: (a) receiving a power control message from a base-station transmitted via a downlink; (b) acquiring a channel gain value between said mobile terminal and said base-station according to information transmitted via the downlink; (c) calculating a value of the transmit power of said mobile terminal according to said power control message, said channel gain value and a set processing gain value; and (d) adjusting the transmit power of said mobile terminal according to said value of the transmit power, wherein said adjusting the transmit power of said mobile terminal is synchronized with those of other terminals assigned within a same time slot; wherein said power control message at least includes items of background noise, inter-cell interference power level and target signal-to-interference ratio which have changed; and wherein step (c) further includes a step of calculating the value of the transmit power according to following formula:

$$p_i = \frac{SIR_{target\ i} \cdot (I_{inter} + N_{bk})}{r_i \cdot (G + SIR_{target\ i}) \cdot \left(1 - \sum_{i=1}^{n} \frac{SIR_{target\ i}}{G + SIR_{target\ i}}\right)}$$

Wherein:
$P_i$ is the value of the transmit power of the mobile terminal;
$SIR_{target\ i}$ is a target signal-to-interference ratio;
$I_{inter}$ is inter-cell interference power level;
$N_{bk}$ is background noise;
$r_i$ is the channel gain;
G is the processing gain;
n is the number of mobile terminals assigned within one time slot;
wherein $N_{bk}$, $I_{inter}$ and $SIR_{target\ i}$ are acquired according to said power control message transmitted via the downlink.

2. The method of claim 1, wherein said items of background noises, inter-cell interference power level and target signal-to-interference ratio which have not changed are not included in said power control message and are used in a calculation of a new power value.

3. The method of claim 1, wherein when all of said mobile terminals have substantially the same $SIR_{target}$, the value of the transmit power is calculated according to following formula:

$$p_i = \frac{I_{inter} + N_{bk}}{r_i \cdot \left(\frac{G}{SIR_{taret}} - (n-1)\right)}$$

Wherein:
$P_i$ is the value of the transmit power of the mobile terminal;
$SIR_{target\ i}$ is a target signal-to-interference ratio;
$I_{inter}$ is inter-cell interference power level;
$N_{bk}$ is background noise;
$r_i$ is the channel gain;
G is the processing gain;

n is the number of mobile terminals assigned within one time slot.

4. The method of claim 1, wherein when said power control message changes, the mobile terminal receives said power control message broadcast via the downlink.

5. The method of claim 3, wherein when said power control message changes, the mobile terminal receives said power control message broadcasted via the downlink.

6. A device for controlling a mobile terminal's transmit power in CDMA-TDD system, comprising: a receiving module, receiving a power control message from a base-station transmitted via a downlink; a channel gain calculating module, acquiring a channel gain value between said mobile terminal and said base-station according to information transmitted via the downlink; and a transmit power calculating and setting module, calculating a value of the transmit power of said mobile terminal according to said power control message, said channel gain value and a set processing gain value, and adjusting the transmit power of said mobile terminal according to said value of the calculated transmit power, wherein said adjusting the transmit power of said mobile terminal is synchronized with those of other terminals assigned within a same time slot;

wherein said power control message at least includes items of background noise, inter-cell interference power level and target signal-to-interference ratio which have changed, wherein said transmit power calculating and setting module calculates the value of the transmit power according to following formula:

$$p_i = \frac{SIR_{target\ i} \cdot (I_{inter} + N_{bk})}{r_i \cdot (G + SIR_{target\ i}) \cdot \left(1 - \sum_{i=1}^{n} \frac{SIR_{target\ i}}{G + SIR_{target\ i}}\right)}$$

Wherein:
$P_i$ is the value of the transmit power of the mobile terminal;
$SIR_{target\ i}$ is a target signal-to-interference ratio;
$I_{inter}$ is inter-cell interference power level;
$N_{bk}$ is background noise;
$r_i$ is the channel gain;
G is the processing gain;
n is the number of mobile terminals assigned within one time slot;
wherein $N_{bk}$, $I_{inter}$ and $SIR_{target\ i}$ are acquired according to said power control message transmitted via the downlink.

7. The device of claim 6, wherein said items of background noises, inter-cell interference power level and target signal-to-interference ratio which have not changed are not included in said power control message and said items are used in a calculation of a new power value.

8. The device of claim 6, wherein when all of said mobile terminals have substantially same $SIR_{target}$, said transmit power calculating and setting module calculates the value of the transmit power according to following formula:

$$p_i = \frac{I_{inter} + N_{bk}}{r_i \cdot \left(\frac{G}{SIR_{target}} - (n-1)\right)}$$

Wherein:
$P_i$ is the value of the transmit power of the mobile terminal;
$SIR_{target\ i}$ is a target signal-to-interference ratio;

$I_{inter}$ is inter-cell interference power level;
$N_{bk}$ is background noise;
$r_i$ is the channel gain;
G is the processing gain;
n is the number of mobile terminals assigned within one time slot.

9. The method of claim 8, wherein when said power control message changes, the mobile terminal receives said power control message broadcasted via the downlink.

10. A mobile terminal in CDMA-TDD system, comprising:
a receiving means, receiving and processing wireless signals from a downlink; a
transmitting means, transmitting wireless signals via a uplink; and a transmit power control means, receiving a power control message transmitted via the downlink, after acquiring a channel gain value between said mobile terminal and a base-station, calculating a value of the transmit power of said mobile terminal according to said power control message, said channel gain value and a set processing gain value, and adjusting the transmit power of said mobile terminal according to said value of the transmit power, wherein said adjusting the transmit power of said mobile terminal is synchronized with those of other terminals assigned within a same time slot;
wherein said power control message at least includes items of background noise, inter-cell interference power level and target signal-to-interference ratio which have changed, and
wherein said transmit power control means calculates the value of the transmit power according to following formula:

$$p_i = \frac{SIR_{target\ i} \cdot (I_{inter} + N_{bk})}{r_i \cdot (G + SIR_{target\ i}) \cdot \left(1 - \sum_{i=1}^{n} \frac{SIR_{target\ i}}{G + SIR_{target\ i}}\right)}$$

Wherein:
$P_i$ is the value of the transmit power of the mobile terminal;
$SIR_{target\ i}$ is a target signal-to-interference ratio;
$I_{inter}$ is inter-cell interference power level;
$N_{bk}$ is background noise;
$r_i$ is the channel gain;
G is the processing gain;
n is the number of mobile terminals assigned within one time slot;
wherein $N_{bk}$, and $SIR_{target\ i}$ are acquired according to said power control message transmitted via the downlink.

11. The mobile terminal of claim 10, wherein said items of background noises, inter-cell interference power level and target signal-to-interference ratio which have not changed are included in said power control message and said items are used in a calculation of a new power value.

12. The mobile terminal of claim 10, wherein when all of said mobile terminals have substantially same $SIR_{target}$, said transmit power control means calculates the value of the transmit power according to following formula:

$$p_i = \frac{I_{inter} + N_{bk}}{r_i \cdot \frac{G}{SIR_{target}} - (n-1)}$$

Wherein:
$P_i$ is the value of the transmit power of the mobile terminal;
$SIR_{target\ i}$ is a target signal-to-interference ratio;
$I_{inter}$ is inter-cell interference power level;
$N_{bk}$ is background noise;
$r_i$ is the channel gain;
G is the processing gain;
n is the number of mobile terminals assigned within one time slot.

13. The mobile terminal of claim 12, wherein when said power control message changes, the mobile terminal receives said power control message broadcasted via the downlink.

14. A method for power control in a base station, comprising: transmitting a power control message via a downlink; and transmitting information via the downlink, wherein said information is related to a transmit power used when the base station transmits signals; and simultaneously receiving power information transmitted by each mobile terminal assigned in a same time slot;
wherein the power information received by the base station includes a transmit power calculated according to the following formula:

$$p_i = \frac{SIR_{target\ i} \cdot (I_{inter} + N_{bk})}{r_i \cdot (G + SIR_{target\ i}) \cdot \left(1 - \sum_{i=1}^{n} \frac{SIR_{target\ i}}{G + SIR_{target\ i}}\right)}$$

Wherein:
$P_i$ is the value of the transmit power of the mobile terminal;
$SIR_{target\ i}$ is a target signal-to-interference ratio;
$I_{inter}$ is inter-cell interference power level;
$N_{bk}$ is background noise;
$r_i$ is the channel gain;
G is the processing gain;
n is the number of mobile terminals assigned within one time slot;
wherein $N_{bk}$, $I_{inter}$ and $SIR_{target\ i}$ are acquired according to said power control message transmitted via the downlink.

15. The method of claim 14, wherein said power control message at least includes items of background noise, inter-cell interference power level and target signal-to-interference ratio which have changed.

16. The method of claim 14, wherein when said power control message changes, the base station transmits said power control message.

* * * * *